(12) United States Patent
Hasegawa et al.

(10) Patent No.: US 12,011,904 B2
(45) Date of Patent: *Jun. 18, 2024

(54) PRODUCTION METHOD FOR LAMINATE OF FLUOROSILICONE RUBBER AND SILICONE RUBBER

(71) Applicant: DOW TORAY CO., LTD., Tokyo (JP)

(72) Inventors: Chiichiro Hasegawa, Ichihara (JP); Naoya Ishigami, Ichihara (JP)

(73) Assignee: DOW TORAY CO., LTD., Tokyo (JP)

(*) Notice: Subject to any disclaimer, the term of this patent is extended or adjusted under 35 U.S.C. 154(b) by 373 days.

This patent is subject to a terminal disclaimer.

(21) Appl. No.: 17/262,566

(22) PCT Filed: Jul. 24, 2019

(86) PCT No.: PCT/JP2019/029108
§ 371 (c)(1),
(2) Date: Jan. 22, 2021

(87) PCT Pub. No.: WO2020/022406
PCT Pub. Date: Jan. 30, 2020

(65) Prior Publication Data
US 2021/0300003 A1    Sep. 30, 2021

(30) Foreign Application Priority Data
Jul. 25, 2018  (JP) ................. 2018-139656

(51) Int. Cl.
| B32B 25/20 | (2006.01) |
| B32B 25/04 | (2006.01) |
| C08G 77/24 | (2006.01) |
| C08K 3/36 | (2006.01) |
| C08K 5/14 | (2006.01) |
| C08G 77/08 | (2006.01) |

(52) U.S. Cl.
CPC ............ B32B 25/20 (2013.01); B32B 25/042 (2013.01); C08G 77/24 (2013.01); C08K 3/36 (2013.01); C08K 5/14 (2013.01); B32B 2305/72 (2013.01); C08G 77/08 (2013.01)

(58) Field of Classification Search
CPC ................................ C08G 77/24; B32N 20/25
USPC ........................................................ 428/447
See application file for complete search history.

(56) References Cited

U.S. PATENT DOCUMENTS

| 4,985,526 A | | 1/1991 | Kishita et al. |
| 5,264,522 A | | 11/1993 | Mize et al. |
| 5,302,632 A | * | 4/1994 | Maxson .................. C08L 83/04 523/213 |
| 5,547,742 A | * | 8/1996 | Satoh ...................... C08L 83/08 428/339 |
| 6,265,515 B1 | | 7/2001 | Mera et al. |
| 6,303,675 B1 | | 10/2001 | Kobayashi et al. |
| 7,045,586 B2 | | 5/2006 | Ahn et al. |
| 7,510,772 B2 | * | 3/2009 | Uno ........................ C08L 83/08 528/42 |
| 2002/0132902 A1 | | 9/2002 | Shiono |
| 2006/0281875 A1 | | 12/2006 | Uno et al. |
| 2008/0308227 A1 | | 12/2008 | Drake et al. |
| 2010/0055449 A1 | | 3/2010 | Ota |
| 2010/0098892 A1 | | 4/2010 | Hayashida et al. |
| 2014/0335296 A1 | | 11/2014 | Wang |
| 2015/0166765 A1 | | 6/2015 | Hayashida et al. |

FOREIGN PATENT DOCUMENTS

| CN | 101616795 A | 12/2009 |
| CN | 101724274 A | 6/2010 |
| CN | 202847021 U | 4/2013 |
| CN | 104710798 A | 6/2015 |
| EP | 2316872 A2 | 5/2011 |
| EP | 2700677 A1 | 2/2014 |
| JP | H0693184 A | 4/1994 |
| JP | 2000248183 A | 9/2000 |
| JP | 2002194220 A | 7/2002 |
| JP | 2002212425 A | 7/2002 |
| JP | 2006328303 A | 12/2006 |

(Continued)

OTHER PUBLICATIONS

English translation of International Search Report for PCT/JP2019/029108 dated Oct. 15, 2019, 2 pages
Machine assisted English translation of JP2002194220A obtained from https://patents.google.com/patent on Feb. 23, 2021, 11 pages.
Machine assisted English translation of JP2010126712A obtained from https://patents.google.com/patent on Feb. 23, 2021, 8 pages.
Machine assisted English translation of JP2013103963A obtained from https://patents.google.com/patent on Feb. 23, 2021, 7 pages.
Machine assisted English translation of JP2016151834A obtained from https://patents.google.com/patent on Feb. 23, 2021, 13 pages.

(Continued)

Primary Examiner — Margaret G Moore
(74) Attorney, Agent, or Firm — WARNER NORCROSS + JUDD LLP

(57) ABSTRACT

A production method for a laminate of a fluorosilicone rubber and a silicone rubber is provided. The production method comprises the following steps: (1) curing a fluorosilicone rubber composition comprising: (A) an organopolysiloxane having alkenyl groups and fluoroalkyl groups, (B) an organopolysiloxane having silicon atom-bonded hydrogen atoms and fluoroalkyl groups, and (C) a hydrosilylation reaction catalyst; (2) laminating a silicone rubber composition comprising: (D) an organopolysiloxane having alkenyl groups and not having fluoroalkyl groups, and (E) an organic peroxide on a surface of a fluorosilicone rubber produced in step (1) above; and (3) curing a silicone rubber composition layer in a laminate produced in step (2) above. A laminate in which a fluorosilicone rubber layer and a silicone rubber layer are adhered well using a hydrosilylation reaction curable fluorosilicone rubber composition is produced.

17 Claims, 1 Drawing Sheet

(56) References Cited

FOREIGN PATENT DOCUMENTS

| | | |
|---|---|---|
| JP | 2008013319 A | 1/2008 |
| JP | 2008031227 A | 2/2008 |
| JP | 2008540754 A | 11/2008 |
| JP | 2010126712 A | 6/2010 |
| JP | 2011093996 A | 5/2011 |
| JP | 2013103963 A | 5/2013 |
| JP | 2015502431 A | 1/2015 |
| JP | 2016151834 A | 8/2016 |
| WO | 2008013319 A1 | 1/2008 |
| WO | 2016032794 A1 | 3/2016 |

OTHER PUBLICATIONS

Machine assisted English translation of JP2008013319A obtained from https://patents.google.com/patent on May 16, 2022, 6 pages.
Machine assisted English translation of CN202847021U obtained from https://patents.google.com/patent on May 16, 2022, 4 pages.
M.A Grunlan et al., "Synthesis of fluorinated copoly(carbosiloxane)s by Pt-catalyzed hydrosilylation copolymerization", Polymer, Elsevier Science Ltd., 2003, 44(4), p. 981-987.

* cited by examiner

[FIG. 1]
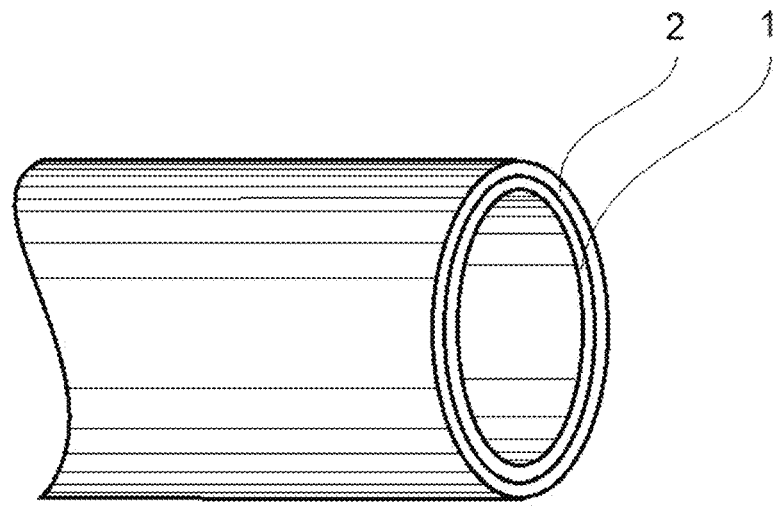
[FIG. 2]
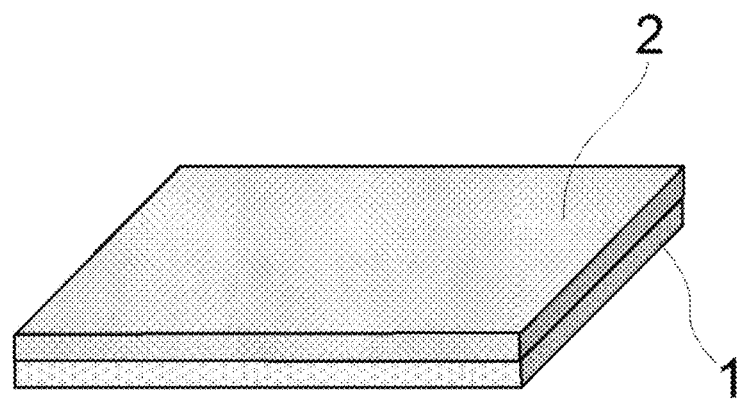
[FIG. 3]
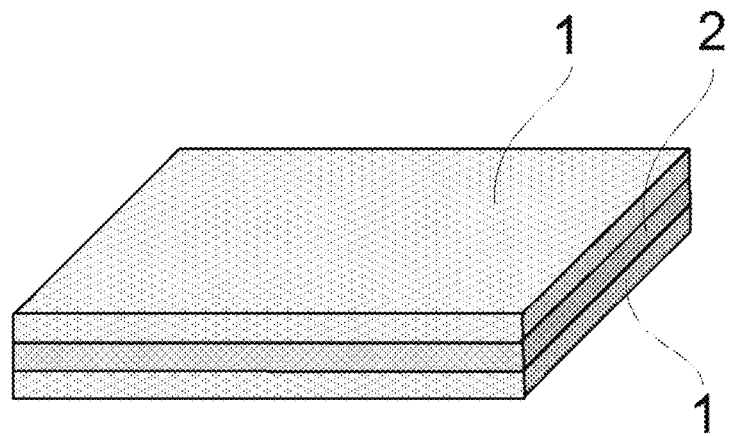

PRODUCTION METHOD FOR LAMINATE OF FLUOROSILICONE RUBBER AND SILICONE RUBBER

CROSS-REFERENCE TO RELATED APPLICATIONS

This application is the U.S. National Stage of International Application No. PCT/JP2019/029108 filed on 24 Jul. 2019, which claims priority to and all advantages of Japanese Application No. 2018-139656, filed on 25 Jul. 2018, the content of which is incorporated herein by reference.

TECHNICAL FIELD

The present invention relates to a production method for a laminate of a fluorosilicone rubber and a silicone rubber.

BACKGROUND ART

A fluorosilicone rubber formed from an organopolysiloxane that substantially contains a fluoroalkyl group such as a 3,3,3-trifluoropropyl group is used as a rubber material for automobiles or aircraft due to the excellent heat resistance, cold resistance, oil resistance, and fuel resistance thereof. As a rubber material for automobiles and for turbo hoses, in particular, a laminate having a fluorosilicone rubber layer on the hose inner circumferential surface and having a silicone rubber layer formed from an organopolysiloxane having substantially no fluoroalkyl groups on the hose outer circumferential surface is used. However, the adhesion between the fluorosilicone rubber and the silicone rubber is insufficient, and peeling tends to occur at the contact interface thereof, so various methods for solving this problem have been proposed.

Examples of methods that have been proposed as production methods for a laminate made of a fluorosilicone rubber and a silicone rubber include: a method of compounding a copolymer of dimethylsiloxane and methyl(3,3,3-trifluoropropyl)siloxane capped at a molecular chain terminal with a silanol group and having a viscosity at 25° C. of not greater than 100 mPa·s into ether one or both of a rubber composition which forms a fluorosilicone rubber and a silicone rubber, and adhering each other (see Patent Document 1); a method of molding an organic peroxide curable fluorosilicone rubber composition containing a hydrosilylation reaction catalyst or an organopolysiloxane having at least 2 silicon atom-bonded hydrogen atoms per molecule, and an organic peroxide curable dimethylsilicone rubber composition containing a hydrosilylation reaction catalyst or an organopolysiloxane having at least 2 silicon atom-bonded hydrogen atoms per molecule, into a prescribed shape and then curing the compositions while inducing a hydrosilylation reaction in a state in which the compositions are brought into contact with one another (see Patent Document 2); a method of using a fluorosilicone rubber composition comprising: an organopolysiloxane having an alkenyl group and a trifluoropropyl group, a silica filler, an organohydrogenpolysiloxane having methyl(trifluoropropyl)siloxane units, methylhydrogensiloxane units, and methylvinylsiloxane units, and an organic peroxide (see Patent Document 3); a method of compounding an adhesion aid made of a reinforcing silica having a BET specific surface area of 250 $m^2/g$ and an organohydrogenpolysiloxane having methyl(3,3,3-trifluoropropyl)siloxane units, methylhydrogensiloxane units, and dimethylvinylsiloxane units with one or both of a fluorosilicone rubber composition and a dimethylsilicone rubber composition when bonding the compositions by co-vulcanization (see Patent Document 4); a method of using a silicone rubber composition comprising: an organopolysiloxane, a silica filler, an organohydrogenpolysiloxane having methyl(trifluoropropyl)siloxane units, methylhydrogensiloxane units, and vinyl group-containing siloxane units, and an organic peroxide (see Patent Document 5); and a method of curing an organic peroxide curable fluorosilicone rubber composition containing a hydrosilylation reaction catalyst or an organopolysiloxane having at least 2 silicon atom-bonded hydrogen atoms per molecule, and an organic peroxide curable silicone rubber composition containing a hydrosilylation reaction catalyst or an organopolysiloxane having at least 2 silicon atom-bonded hydrogen atoms per molecule, in a state in which these compositions are brought into contact with one another via a mixed composition of the fluorosilicone rubber composition and the silicone rubber composition (see Patent Document 6).

However, in each of these methods, the fluorosilicone composition is limited to a composition that is cured by an organic peroxide, and there has been no interest in enhancing the adhesion between the fluorosilicone rubber and the silicone rubber using a hydrosilylation reaction curable fluorosilicone rubber composition.

PRIOR ART DOCUMENTS

Patent Documents

Patent Document 1: JP 2006-328303 A
Patent Document 2: JP 2008-540754 T
Patent Document 3: JP 2010-126712 A
Patent Document 4: JP 2011-093996 A
Patent Document 5: JP 2013-103963 A
Patent Document 6: JP 2015-502431 T

SUMMARY OF THE INVENTION

Problems to be Solved by the Invention

An object of the present invention is to provide a production method for a laminate of a fluorosilicone rubber and a silicone rubber, wherein a hydrosilylation reaction curable fluorosilicone rubber composition is used so that a fluorosilicone rubber layer and a silicone rubber layer are adhered well.

Means for Solving the Problems

The production method of the present invention for a laminate of a fluorosilicone rubber and a silicone rubber, comprises the following steps (1) to (3):
(1) curing a fluorosilicone rubber composition comprising components (A) to (C) below;
(A) 100 parts by mass of (A1) an organopolysiloxane having at least 2 alkenyl groups per molecule, wherein at least 20 mol % of all silicon atom-bonded organic groups are fluoroalkyl groups, or a mixture of components (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;
(B) an organopolysiloxane having at least 2 silicon atom-bonded hydrogen atoms and at least 1 fluoroalkyl group per molecule, in an amount that the silicon atom-bonded hydrogen atoms in this component exceed 1 mol per 1 mol of the alkenyl groups in component (A); and
(C) a hydrosilylation reaction catalyst in a catalytic amount,
(2) laminating a silicone rubber composition comprising components (D) and (E) below on a surface of a fluorosilicone rubber produced in step (1) above;
(D) 100 parts by mass of an organopolysiloxane having at least 1 alkenyl group per molecule, and having no fluoroalkyl groups or having fluoroalkyl groups in a proportion of less than 20 mol % of all silicon atom-bonded organic groups; and
(E) from 0.1 to 10 parts by mass of an organic peroxide; and
(3) curing the silicone rubber composition laminated in step (2) above.

In the production method of the present invention, the fluorosilicone rubber composition preferably further comprises: a silica fine powder.

In addition, in the production method of the present invention, the fluorosilicone rubber composition preferably further comprises: a reaction inhibitor.

Further, another production method of the present invention for a laminate of a fluorosilicone rubber and a silicone rubber, comprises the following steps (1') to (2'):
(1') producing a laminate of a fluorosilicone rubber composition layer and a silicone rubber composition layer by laminating a fluorosilicone rubber composition comprising components (A) to (C) below:
(A) 100 parts by mass of (A1) an organopolysiloxane having at least 2 alkenyl groups per molecule, wherein at least 20 mol % of all silicon atom-bonded organic groups are fluoroalkyl groups, or a mixture of components (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;
(B) an organopolysiloxane having at least 2 silicon atom-bonded hydrogen atoms and at least 1 fluoroalkyl group per molecule, in an amount that the silicon atom-bonded hydrogen atoms in this component exceed 1 mol per 1 mol of the alkenyl groups in component (A); and
(C) a hydrosilylation reaction catalyst in a catalytic amount, and a silicone rubber composition comprising components (D) and (E) below:
(D) 100 parts by mass of an organopolysiloxane having at least 1 alkenyl group per molecule, and having no fluoroalkyl groups or having fluoroalkyl groups in a proportion of less than 20 mol % of all silicon atom-bonded organic groups; and
(E) from 0.1 to 10 parts by mass of an organic peroxide; and
(2') curing the fluorosilicone rubber composition layer and the silicone rubber composition layer of the laminate produced in step (1') above.

In the production method of the present invention, the fluorosilicone rubber composition preferably further comprises: a silica fine powder.

In addition, in the production method of the present invention, the fluorosilicone rubber composition preferably further comprises: a reaction inhibitor.

Effects of the Invention

The production method of the present invention has the feature that a laminate in which a fluorosilicone rubber layer and a silicone rubber layer are adhered well can be produced using a hydrosilylation reaction curable fluorosilicone rubber composition.

BRIEF DESCRIPTION OF THE DRAWINGS

FIG. 1 is a perspective view with a partial break of a rubber hose as an example of a laminate of a fluorosilicone rubber and a silicone rubber produced with the production method of the present invention.

FIG. 2 is a perspective view of a rubber sheet as an example of a laminate of a fluorosilicone rubber and a silicone rubber produced with the production method of the present invention.

FIG. 3 is a perspective view of a rubber sheet as another example of a laminate of a fluorosilicone rubber and a silicone rubber produced with the production method of the present invention.

MODE FOR CARRYING OUT THE INVENTION

The production method of the present invention for a laminate of a fluorosilicone rubber and a silicone rubber, comprises the following steps (1) to (3):

[Step (1)]

First, a fluorosilicone rubber composition comprising the following components (A) to (C) is cured:
(A) (A1) an organopolysiloxane having at least 2 alkenyl groups pre molecule, wherein at least 20 mol % of all silicon atom-bonded organic groups are fluoroalkyl groups, or a mixture of components (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;
(B) an organopolysiloxane having at least 2 silicon atom-bonded hydrogen atoms and at least 1 fluoroalkyl group per molecule; and
(C) a hydrosilylation reaction catalyst.

Component (A) is a main agent of the fluorosilicone rubber composition described above, and is (A1) an organopolysiloxane having at least 2 alkenyl groups per molecule, wherein at least 20 mol % of all silicon atom-bonded organic groups are fluoroalkyl groups, or a mixture of component (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups.

Component (A1) is an organopolysiloxane having at least 2 alkenyl groups per molecule, wherein at least 20 mol % of all silicon atom-bonded organic groups are fluoroalkyl groups. Examples of the alkenyl groups in component (A1) include alkenyl groups having from 2 to 12 carbon atoms such as vinyl groups, allyl groups, butenyl groups, and hexenyl groups, and vinyl groups are preferable. In addition, examples of the fluoroalkyl groups in component (A1) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, and 7,7,7,6,6,5,5,4,4,3,3-undecafluoroheptyl groups, and 3,3,3-trifluoropropyl groups, 4,4,4,3,3-pentafluorobutyl groups, and 5,5,5,4,4,3,3-heptafluoropentyl groups are preferable. A proportion of the fluoroalkyl groups in component (A1) is at least 20 mol % and preferably at least 30 mol % and at most 70 mol % or at most 60 mol % of all silicon atom-bonded organic groups. Note that the proportion of the fluoroalkyl groups can be any range obtained by combining the abovementioned lower limits and upper limits. This is because, when the proportion of the fluoroalkyl groups in component (A1) is greater than or equal to the lower limit described above, the oil resistance and fuel resistance of the resulting fluorosilicone rubber are enhanced, whereas when the proportion is less than or equal to the upper limit described above, the heat resistance and cold resistance of the resulting fluorosilicone rubber are enhanced. Examples of groups bonded to silicon atoms other than the alkenyl groups and fluoroalkyl groups in component (A1) include monovalent hydrocarbon groups having from 1 to 20 carbon atoms and preferably having from 1 to 8 carbon atoms. Specific examples thereof include alkyl groups such as methyl groups, ethyl groups, propyl groups, and butyl groups; cycloalkyl groups such as cyclohexyl groups; aryl groups such as phenyl groups and tolyl groups; and aralkyl groups such as benzyl groups and phenethyl groups. Alkyl groups are preferable, and methyl groups are particularly preferable.

The molecular structure of such a component (A1) is not limited, and may be, for example, a straight-chain structure, a partially branched straight-chain structure, or a branched-chain structure. In addition, the viscosity of component (A1) is not limited, and the component is preferably from a liquid substance having a viscosity at 25° C. of at least 1 Pas to a crude rubber substance. A liquid substance is particularly preferably a substance having a viscosity at 25° C. of at least 10 Pa·s and at most 1,000 Pa·s. Note that the viscosity of component (A1) at 25° C. can be measured with a rotational viscometer conforming to JIS K7117-1. On the other hand, a crude rubber substance is particularly preferably a raw rubber substance having a Williams plasticity at 25° C. of from 100 to 800 as specified by JIS K 6249, a crude rubber substance having a Williams plasticity of from 100 to 400, or a crude rubber substance having a Williams plasticity of from 200 to 400.

Component (A2) is an organopolysiloxane having at least 2 alkenyl groups per molecule, and having no fluoroalkyl groups or having fluoroalkyl groups in a proportion of less than 20 mol % of all silicon atom-bonded organic groups. Examples of the alkenyl groups in component (A2) include alkenyl groups having from 2 to 12 carbon atoms such as vinyl groups, allyl groups, butenyl groups, and hexenyl groups, and vinyl groups are preferable. Component (A2) has no fluoroalkyl groups or has fluoroalkyl groups in a proportion of less than 20 mol % of all silicon atom-bonded organic groups. Examples of the fluoroalkyl groups that may be present in component (A2) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, and 7,7,7,6,6,5,5,4,4,3,3-undecafluoroheptyl groups, and 3,3,3-trifluoropropyl groups, 4,4,4,3,3-pentafluorobutyl groups, and 5,5,5,4,4,3,3-heptafluoropentyl groups are preferable. Examples of groups bonded to silicon atoms other than the alkenyl groups and fluoroalkyl groups in component (A2) include monovalent hydrocarbon groups having from 1 to 20 carbon atoms and preferably having from 1 to 8 carbon atoms. Specific examples thereof include alkyl groups such as methyl groups, ethyl groups, propyl groups, and butyl groups; cycloalkyl groups such as cyclohexyl groups; aryl groups such as phenyl groups and tolyl groups; and aralkyl groups such as benzyl groups and phenethyl groups. Alkyl groups are preferable, and methyl groups are particularly preferable.

The molecular structure of such a component (A2) is not limited, and may be, for example, a straight-chain structure, a partially branched straight-chain structure, or a branched-chain structure. In addition, the viscosity of component (A2) is not limited, and the component is preferably from a liquid substance having a viscosity at 25° C. of at least 1 Pas to a crude rubber substance. A liquid substance is particularly preferably a substance having a viscosity at 25° C. of at least 10 Pa·s and at most 1,000 Pa·s. Note that the viscosity of component (A2) at 25° C. can be measured with a rotational viscometer conforming to JIS K7117-1. On the other hand, a crude rubber substance is, in particular, a raw rubber substance having a Williams plasticity at 25° C. of from 100 to 800 as specified by JIS K 6249, a crude rubber substance having a Williams plasticity of from 100 to 400.

Component (A) is either component (A1) alone or a mixture of component (A1) and component (A2). When component (A) is a mixture of component (A1) and component (A2) described above, a mass ratio of component (A1) to component (A2) is preferably within a range of from 50:50 to 99:1, 60:40 to 99:1, 70:30 to 99:1, 80:20 to 99:1, or 85:15 to 99:1. This is because, when a proportion of component (A1) is greater than or equal to the lower limit of the range described above, the oil resistance and fuel resistance of the resulting fluorosilicone rubber are enhanced, whereas when the proportion is less than or equal to the upper limit of the range described above, the adhesion between the resulting fluorosilicone rubber and silicone rubber becomes favorable in the laminate after being exposed to a high-temperature environment.

Component (B) is a cross-linking agent of the fluorosilicone rubber composition and is an organopolysiloxane having at least 2 silicon atom-bonded hydrogen atoms and at least 1 fluoroalkyl group per molecule. Examples of the fluoroalkyl groups in component (B) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, and 7,7,7,6,6,5,5,4,4,3,3-undecafluoroheptyl groups, and 3,3,3-trifluoropropyl groups, 4,4,4,3,3-pentafluorobutyl groups, and 5,5,5,4,4,3,3-heptafluoropentyl groups are preferable. A proportion of the fluoroalkyl groups in component (B) is not limited, but is at least 5 mol %, at least 10 mol %, or at least 15 mol % and at most 70 mol %, at most 60 mol %, at most 50 mol %, or at most 40 mol % of all silicon atom-bonded organic groups. Note that the proportion of the fluoroalkyl groups can be any range obtained by combining the abovementioned lower limits and upper limits. This is because, when the proportion of the fluoroalkyl groups in component (B) is greater than or equal to the lower limit described above, the oil resistance and fuel resistance of the resulting fluorosilicone rubber are enhanced, and the adhesion between the resulting fluorosilicone rubber and silicone rubber are enhanced, whereas when the proportion is less than or equal to the upper limit described above, the heat resistance and cold resistance of the resulting fluorosilicone rubber are enhanced. Examples of groups bonded to silicon atoms other than the hydrogen atoms and fluoroalkyl groups in component (B) include monovalent hydrocarbon groups having no aliphatic unsaturated bonds and having from 1 to 20 carbon atoms and preferably having from 1 to 8 carbon atoms. Specific examples thereof include alkyl groups such as methyl groups, ethyl groups, propyl groups, and butyl groups; cycloalkyl groups such as cyclohexyl groups; aryl groups such as phenyl groups and tolyl groups; and aralkyl groups such as benzyl groups and phenethyl groups. Alkyl groups are preferable, and methyl groups are particularly preferable.

The molecular structure of component (B) is not limited, and examples include a straight-chain structure, a partially branched straight-chain structure, a branched structure, a mesh structure, and a cyclic structure. A mixture of two or more types of these molecular structures may also be used. Examples of such a component (B) include an organopolysiloxane represented by the general formula:

$$R^1{}_3SiO(R^1R^f SiO)_m(R^1HSiO)_nSiR^1{}_3$$

and an organopolysiloxane represented by the average unit formula:

$$[HR^1{}_2SiO_{1/2}]_a(R^f SiO_{3/2})_b.$$

In the formulas, each $R^1$ represents the same or different monovalent hydrocarbon group having no aliphatic unsaturated bonds and having from 1 to 20 carbon atoms, and examples thereof include the same groups as those described above. Alkyl groups are preferable, and methyl groups are particularly preferable.

In addition, in the formulas, each $R^f$ represents the same or different fluoroalkyl group, and examples thereof include the same groups as those described above.

Further, in the formulas, "m" is an integer of 1 or greater; "n" is an integer of 2 or greater; the total of "m" and "n" is an integer within a range of from 5 to 100; and the total of "m" and "n" is preferably an integer within a range of from 10 and 50. In addition, a proportion of $R^f$ with respect to the total of $R^1$ and $R^f$ per molecule is preferably at least 5 mol %, at least 10 mol %, or at least 15 mol % and at most 70 mol %, at most 60 mol %, at most 50 mol %, or at most 40 mol %. Note that the proportion of $R^f$ can be any range obtained by combining the abovementioned lower limits and upper limits.

Further, in the formulas, "a" and "b" are respectively numbers that satisfy: 0<a<1, 0<b<1, and a+b=1. In addition, a proportion of $R^f$ with respect to the total of $R^1$ and $R^f$ per molecule is preferably at least 5 mol %, at least 10 mol %, or at least 15 mol % and at most 70 mol %, at most 60 mol %, at most 50 mol %, or at most 40 mol %. Note that the proportion of $R^f$ can be any range obtained by combining the abovementioned lower limits and upper limits.

In the fluorosilicone rubber composition described above, the content of component (B) is an amount such that the silicon atom-bonded hydrogen atoms in the component are greater than 1 mol per 1 mol of the total of alkenyl groups in component (A), and preferably an amount such that the silicon atom-bonded hydrogen atoms are not less than 1.1 mol and not greater than 30 mol, not greater than 20 mol, not greater than 15 mol, or not greater than 10 mol. Note that the content of component (B) can be any range obtained by combining the abovementioned lower limits and upper limits. This is because, when the content of component (B) is greater than or equal to the lower limit of the range described above, the adhesion between the resulting fluorosilicone rubber and silicone rubber is good, whereas when the content is less than or equal to the upper limit of the range described above, the adhesion between the resulting fluorosilicone rubber and silicone rubber becomes favorable in the laminate after being exposed to a high-temperature environment.

Component (C) is a hydrosilylation reaction catalyst for accelerating the curing of the fluorosilicone rubber composition described above. Examples of component (C) include platinum-based catalysts, palladium-based catalysts, and rhodium-based catalysts, and platinum-based catalysts are preferable. Examples of platinum-based catalysts include chloroplatinic acid, alcohol solutions of chloroplatinic acid, carbonyl complexes of platinum, alkenyl siloxane complexes of platinum, olefin complexes of platinum, and microcapsulated catalysts with capsules made from acrylic resins, polycarbonate resins, or silicone resins in which the aforementioned platinum catalysts are dispersed or contained and which should have a softening point within a range of 40 to 170° C. In particular, alkenyl siloxane complexes of platinum are preferable in that the compatibility with component (A) is good. Examples of alkenyl siloxanes in this alkenyl siloxane complex of platinum include 1,3-divinyltetramethyldisiloxane and 1,1,3,3-tetravinyldimethyldisiloxane.

The content of component (C) is a catalytic amount that accelerates the curing of the fluorosilicone rubber composition. Specifically, the content is an amount such that the catalyst metal in the component with respect to the fluorosilicone rubber composition is within a range of from 0.1 to 1,000 ppm, within a range of from 0.1 to 500 ppm, or within a range of from 0.1 to 250 ppm in terms of mass units. This is because, when the content of component (C) is greater than or equal to the lower limit of the range described above, the curing of the fluorosilicone rubber composition is accelerated sufficiently, whereas when the content is less than or equal to the lower limit of the range described above, problems such as discoloration are less likely to occur in the obtained fluorosilicone rubber.

The fluorosilicone rubber composition described above may comprise a silica fine powder in order to enhance the mechanical properties of the resulting fluorosilicone rubber. Examples of the silica fine powder include dry method silica such as fumed silica and wet method silica such as precipitated silica. Further, fine powdered silicas in which the surfaces of these silicas are subjected to hydrophobization treatment with an organosilicon compound such as organosilane, hexaorganodisilazane, diorganopolysiloxane, or diorganocyclopolysiloxane can also be used. While the BET specific surface area of the silica fine powder is not limited, it is preferably within a range of from 50 to 400 m²/g or within a range of from 100 to 400 m²/g.

The content of the silica fine powder is not limited, but is preferably not less than 10 parts by mass per 100 parts by mass of component (A) in that the mechanical properties of the resulting fluorosilicone rubber are favorable, and is preferably not greater than 100 parts by mass per 100 parts by mass of component (A) in that the moldability of the resulting fluorosilicone rubber is favorable.

The fluorosilicone rubber composition may also contain a reaction inhibitor to adjust the curing rate. Examples of the reaction inhibitor include alkyne alcohols such as 2-methyl-3-butyn-2-ol, 3,5-dimethyl-1-hexyn-3-ol, 3-methyl-1-pentyn-3-ol, 2-phenyl-3-butyn-2-ol, 1-ethynyl-1-cyclohexanol, 2-ethynylisopropanol, and 2-ethynylbutan-2-ol; silylated acetylene alcohols such as trimethyl(3,5-dimethyl-1-hexyn-3-oxy)silane, dimethylbis(3-methyl-1-butynoxy)silane, methylvinylbis(3-methyl-1-butyn-3-oxy)silane, and [(1,1-dimethyl-2-propynyl)oxy]trimethylsilane; enyne compounds such as 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, and 3-phenyl-3-buten-1-yne; unsaturated carboxylic acid esters such as diallyl maleate, dimethyl maleate, diethyl fumarate, diallyl fumarate, bis-2-methoxy-1-methylethyl maleate, monooctyl maleate, monoisooctyl maleate, monoallyl maleate, monomethyl maleate, monoethyl fumarate, monoallyl fumarate, and 2-methoxy-1-methylethyl maleate; alkenylsiloxanes such as 1,3,5,7-tetramethyl-1,3,5,7-tetravinyl-cyclotetrasiloxane and 1,3,5,7-tetramethyl-1,3,5,7-tetrahexenylcyclotetrasiloxane; and benzotriazoles.

The content of the reaction inhibitor is not limited, but is preferably not greater than 5 parts by mass or not greater than 3 parts by mass and not less than 0.01 parts by mass or not less than 0.1 parts by mass per 100 parts by mass of total component (A) and component (B). Note that the content of the reaction inhibitor can be any range obtained by combining the abovementioned lower limits and upper limits.

In addition, various compounding agents that are ordinarily used in fluorosilicone rubber compositions may also be compounded with the fluorosilicone rubber composition to a degree that the object of the present invention is not diminished. Examples of compounding agents include extender fillers such as diatomaceous earth, quartz powder, and calcium carbonate; thermal conductive fillers such as alumina, zinc oxide, and boron nitride; flame retardant fillers such as magnesium hydroxide, and aluminum hydroxide; carbon black such as acetylene black, furnace black, and channel black; pigments such as titanium oxide, and red iron oxide; heat resistant agents such as rare earth oxides, cerium silanolate, and cerium fatty acid salts; metal mold release agents such as fatty acids such as stearic acid, zinc stearate, and calcium stearate and metal salts thereof; and dispersing agents such as alkoxysilanes, diphenylsilanediol, organofunctional silanes, and diorganosiloxane oligomers capped at both molecular chain terminals with silanol groups.

In step (1), the fluorosilicone rubber composition described above is cured. The forming method is not limited, and examples thereof include die molding, compression molding, transfer molding, injection molding, extrusion molding, calendar molding, and forming method by wrapping a sheet shape fluorosilicone rubber composition around a mandrel, wherein the sheet is formed by using a calendar roll, and the like. And the curing method is not limited to, and a known curing method such as steam vulcanization, or hot air vulcanization can be selected. The shape of the fluorosilicone rubber molded in this way is not limited, and examples thereof include a sheet shape, a roll shape, a tube shape, or a clump shape. In the production method of the present invention, a cylindrical shape is preferably used when molding a hose having a fluorosilicone rubber layer on the inner circumferential surface and having a silicone rubber layer on the outer circumferential surface.

[Step (2)]

Next, a silicone rubber composition comprising the following components (D) and (E) is laminated on a surface of a fluorosilicone rubber produced in step (1) above:

(D) an organopolysiloxane having at least 1 alkenyl group per molecule, and having no fluoroalkyl groups or having fluoroalkyl groups in a proportion of less than 20 mol % of all silicon atom-bonded organic groups; and (E) an organic peroxide.

Component (D) is a main agent of the silicone rubber composition described above, and is an organopolysiloxane having at least 1 alkenyl group per molecule, and having no fluoroalkyl groups or having fluoroalkyl groups in a proportion of less than 20 mol % of all silicon atom-bonded organic groups. Examples of the alkenyl groups in component (D) include alkenyl groups having from 2 to 12 carbon atoms such as vinyl groups, allyl groups, butenyl groups, and hexenyl groups, and vinyl groups are preferable. Component (D) has no fluoroalkyl groups or has fluoroalkyl groups in a proportion of less than 20 mol % of all silicon atom-bonded organic groups. Examples of the fluoroalkyl groups that may be present in component (A2) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, and 7,7,7,6,6,5,5,4,4,3,3-undecafluoroheptyl groups, and 3,3,3-trifluoropropyl groups, 4,4,4,3,3-pentafluorobutyl groups, and 5,5,5,4,4,3,3-heptafluoropentyl groups are preferable. Examples of groups bonded to silicon atoms other than the alkenyl groups and fluoroalkyl groups in component (D) include monovalent hydrocarbon groups having from 1 to 20 carbon atoms and preferably having from 1 to 8 carbon atoms. Specific examples thereof include alkyl groups such as methyl groups, ethyl groups, propyl groups, and butyl groups; cycloalkyl groups such as cyclohexyl groups; aryl groups such as phenyl groups and tolyl groups; and aralkyl groups such as benzyl groups and phenethyl groups. Alkyl groups are preferable, and methyl groups are particularly preferable.

The molecular structure of component (D) is not limited, and may be, for example, a straight-chain structure, a partially branched straight-chain structure, or a branched-chain structure. In addition, the viscosity of component (D) is not limited, and the component is preferably in the form of a crude rubber at 25° C. and is particularly preferably a raw rubber substance having a Williams plasticity at 25° C. of from 100 to 800 as specified by JIS K 6249, a crude rubber substance having a Williams plasticity of from 100 to 400.

Component (E) is an organic peroxide for curing the silicone rubber composition described above. A known organic peroxide may be used as component (E) to cure the silicone rubber composition. Examples of such a component (E) include benzoyl peroxide, tertiary butyl perbenzoate, orthomethyl benzoyl peroxide, paramethyl benzoyl peroxide, ditertiary butyl peroxide, dicumyl peroxide, 1,1-bis(tertiary butyl peroxy)3,3,5-trimethylcyclohexane, 2,5-dimethyl-2,5-di(tertiary butyl peroxy)hexane, 2,5-dimethyl-2,5-di(tertiary butyl peroxy)hexyne, and compositions of two or more types thereof.

The content of component (E) is not limited, but is preferably within a range of from 0.1 to 10 parts by mass, within a range of from 0.1 to 5 parts by mass, or within a range of from 0.1 to 3 parts by mass per 100 parts by mass of component (D). This is because, when the content of component (E) is greater than or equal to the lower limit of the range described above, the resulting composition is cured sufficiently, whereas when the content is less than or equal to the upper limit of the range described above, the mechanical properties of the resulting silicone rubber are favorable.

The silicone rubber composition described above may comprise a silica fine powder in order to enhance the mechanical properties of the resulting silicone rubber. Examples of the silica fine powder include dry method silica such as fumed silica and wet method silica such as precipitated silica. Further, fine powdered silicas in which the surfaces of these silicas are subjected to hydrophobization treatment with an organosilicon compound such as organosilane, hexaorganodisilazane, diorganopolysiloxane, or diorganocyclopolysiloxane can also be used. The BET specific surface area of the silica fine powder is not limited, but is preferably within a range of from 50 to 400 $m^2/g$ or within a range of from 100 to 400 $m^2/g$.

The content of the silica fine powder is not limited, but is preferably not less than 10 parts by mass per 100 parts by mass of component (D) in that the mechanical properties of the resulting silicone rubber are favorable, and is preferably not greater than 100 parts by mass per 100 parts by mass of component (D) in that the moldability of the resulting silicone rubber is favorable.

In addition, the silicone rubber composition described above may comprise other compounding agents that are ordinarily compounded with silicone rubbers as long as the object of the present invention is not diminished, examples of which include extender fillers such as diatomaceous earth, quartz powder, and calcium carbonate; thermal conductive fillers such as alumina, zinc oxide, and boron nitride; flame retardant fillers such as magnesium hydroxide, and aluminum hydroxide; carbon black such as acetylene black, furnace black, and channel black; pigments such as titanium oxide, and red iron oxide; heat resistant agents such as rare earth oxides, cerium silanolate, and cerium fatty acid salts; metal mold release agents such as fatty acids such as stearic acid, zinc stearate, and calcium stearate and metal salts thereof; and dispersing agents such as alkoxysilanes, diphenylsilanediol, organo-functional silanes, and diorganosiloxane oligomers capped at both molecular chain terminals with silanol groups. The compounded amounts thereof are amounts ordinarily compounded with silicone rubbers.

In step (2), the silicone rubber composition described above is laminated on the surface of the fluorosilicone rubber produced in step (1) above. The lamination method is not limited, and examples thereof include a method of placing the silicone rubber composition on the fluorosilicone rubber in a compression molding machine and compression-molding the composition; a method of placing the fluorosilicone rubber in a mold and injecting the silicone rubber composition into the mold; a method of laminating a silicone rubber composition on a fluorosilicone rubber sheet formed by using a calendar roll; and a method of wrapping a sheet shape silicone rubber composition around a fluorosilicone rubber product, wherein the sheet is formed by using a calendar roll, and the like. The thickness of the silicone rubber composition laminated on the fluorosilicone rubber in this way is not limited. The shape of the laminated silicone rubber composition is not limited, and examples thereof include a sheet shape, a roll shape, a tube shape, or a clump shape. In the production method of the present invention, a cylindrical shape is preferably used when molding a hose having a fluorosilicone rubber layer on the inner circumferential surface and having a silicone rubber layer on the outer circumferential surface.

[Step (3)]

Next, the silicone rubber composition laminated in step (2) above is cured. In step (3), the silicone rubber composition can be cured by a known method in the same way of the step (1). In addition, after the laminate of the fluorosilicone rubber and the silicone rubber is molded, secondary vulcanization may be performed by heat-treating the laminate.

Further, the shape of the laminate of the fluorosilicone rubber and the silicone rubber obtained with the production method of the present invention is not limited, but a laminate with a cylindrical shape as illustrated in FIG. 1, wherein the inner circumferential surface is formed from a fluorosilicone rubber layer 1 and the outer circumferential surface is formed from a silicone rubber layer 2, for example, can be used as a hose having excellent heat resistance and fuel resistance, such as a turbocharger hose for connecting a turbocharger and an intercooler. Note that in order to enhance pressure resistance in such a hose, the hose may have a reinforcing fiber layer formed by winding reinforcing fibers such as aramid fibers in the fluorosilicone rubber layer and/or the silicone rubber layer.

In addition, when the shape of the laminate of the fluorosilicone rubber and the silicone rubber obtained with the production method of the present invention is the sheet shape illustrated in FIG. 2 or 3, a laminate in which a fluorosilicone rubber layer 1 is formed on one or both sides of a silicone rubber layer 2 can be used as a sheet exhibiting excellent heat resistance and fuel resistance such as a rubber sheet for a diaphragm, for example.

Further, another production method of the present invention for a laminate of a fluorosilicone rubber and a silicone rubber, comprises the following steps (1') to (2').

[Step (1')]

First, a laminate of a fluorosilicone rubber composition layer and a silicone rubber composition layer is produced, wherein the fluorosilicone rubber composition comprises components (A) to (C) below:

(A) 100 parts by mass of (A1) an organopolysiloxane having at least 2 alkenyl groups per molecule, wherein at least 20 mol % of all silicon atom-bonded organic groups are fluoroalkyl groups, or a mixture of component (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;

(B) an organopolysiloxane having at least 2 silicon atom-bonded hydrogen atoms and at least 1 fluoroalkyl group per molecule; and (C) a hydrosilylation reaction catalyst, and the silicone rubber composition comprises components (D) and (E) below:

(D) 100 parts by mass of an organopolysiloxane having at least 1 alkenyl group per molecule, and having no fluoroalkyl groups or having fluoroalkyl groups in a proportion of less than 20 mol % of all silicon atom-bonded organic groups; and (E) an organic peroxide The fluorosilicone rubber composition and the silicone rubber composition are as described above. The lamination method is not limited, and examples thereof include a method of placing the silicone rubber composition on the fluorosilicone rubber composition in a compression molding machine and compression-molding the compositions; a method of placing the fluorosilicone rubber composition in a mold and injecting the silicone rubber composition into the mold; a method of placing the silicone rubber composition in a mold and injecting the fluorosilicone rubber composition into the mold; a method of laminating a silicone rubber composition and a fluorosilicone rubber by using two step extrusion; and a method of forming a silicone rubber composition sheet and a fluorosilicone rubber sheet produced by a calendar mold, respectively, and then wrapping each sheet around a mandrel. However, according to the two step extrusion and the calendar mold, forming and laminating the fluorosilicone rubber composition and the silicone rubber composition can be executed simultaneously. The thickness of the silicone rubber composition laminated on the fluorosilicone rubber composition in this way is not limited. The shape of the laminated silicone rubber composition is not limited, and examples thereof include a sheet shape, a roll shape, a tube shape, or a clump shape. In the production method of the present invention, a cylindrical shape is preferably used when molding a hose having a fluorosilicone rubber layer on the inner circumferential surface and having a silicone rubber layer on the outer circumferential surface.

[Step (2')]

Next, the fluorosilicone rubber composition and the silicone rubber composition laminated in step (1') above are cured. The curing method is not limited to, and a known curing method such as steam vulcanization, or hot air vulcanization can be selected to cure the fluorosilicone rubber composition and the silicone rubber composition in the laminate. In addition, after the laminate of the fluorosilicone rubber and the silicone rubber is molded, secondary vulcanization may be performed by heat-treating the laminate.

The shape of the laminate of the fluorosilicone rubber and the silicone rubber obtained with the production method of the present invention is not limited, but a laminate with a cylindrical shape, wherein the inner circumferential surface is formed from a fluorosilicone rubber layer and the outer circumferential surface is formed from a silicone rubber layer, for example, can be used as a hose having excellent heat resistance and fuel resistance, such as a turbocharger hose for connecting a turbocharger and an intercooler. Note that in order to enhance pressure resistance in such a hose, the hose may have a reinforcing fiber layer formed by winding reinforcing fibers such as aramid fibers in the fluorosilicone rubber layer and/or the silicone rubber layer.

EXAMPLES

The production method of the present invention for a laminate of a fluorosilicone rubber and a silicone rubber will be described in detail using Practical Examples and Comparative Examples. Note that the present invention is not limited to these examples. In addition, characteristics such as viscosity or plasticity in the examples are values at room temperature (25° C.) unless specified otherwise. Note that the viscosity (Pa·s) is a value measured using a rotational viscometer conforming to JIS K7117-1; the kinematic viscosity (mm$^2$/s) is a value measured with an Ubbelohde viscometer; and the Williams plasticity is a value measured with the method specified in JIS K 6249.

Reference Example 1

First, 100 parts by mass of a copolymer of methylvinylsiloxane and methyl(3,3,3-trifluoropropyl)siloxane capped at both molecular chain terminals with hydroxy groups and having a Williams plasticity of 300 (vinyl group content=0.01 mass %; the proportion of 3,3,3-trifluoropropyl groups per all silicon atom-bonded organic groups=about 50 mol %), 5.6 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 5.6 parts by mass of a copolymer of dimethylsiloxane and methylvinylsiloxane capped at both molecular chain terminals with hydroxy groups and having a Williams plasticity of 160 (vinyl group content=1.4 mass %), 41 parts by mass of fumed silica having a BET specific surface area of 130 m$^2$/g, and 5.6 parts by mass of methyl(3,3,3-trifluoropropyl)siloxane oligomer capped at both molecular chain terminals with hydroxy groups and having a kinematic viscosity of 30 mm$^2$/s were charged into a kneader mixer, mixed for 2 hours at 50° C., and further mixed for 2 hours at 120° C. under reduced pressure to prepare a fluorosilicone rubber base compound.

Next, in 100 parts by mass of this fluorosilicone rubber base compound, 4.6 parts by mass of a copolymer of methylhydrogensiloxane and methyl(3,3,4,4,5,5,6,6,6-nonafluorohexyl)siloxane represented by the formula:

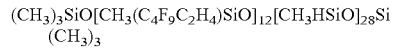

(amount such that silicon atom-bonded hydrogen atoms are 5.5 mol per 1 mol of the total of vinyl groups contained in the fluorosilicone rubber base compound), 5.8 parts by mass of a hydrosilylation reaction catalyst (platinum content=0.02 mass %) prepared by diluting a 1,3-divinyl-1,1,3,3-tetramethyldisiloxane complex of platinum with a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), and 0.03 parts by mass of 1-ethynyl-1-cyclohexanol were uniformly mixed to prepare a fluorosilicone rubber composition (1).

Reference Example 2

First, 100 parts by mass of a copolymer of methylvinylsiloxane and methyl(3,3,3-trifluoropropyl)siloxane capped at both molecular chain terminals with hydroxy groups and having a Williams plasticity of 300 (vinyl group content=0.01 mass %; the proportion of 3,3,3-trifluoropropyl groups per all silicon atom-bonded organic groups=about 50 mol %), 5.6 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 5.6 parts by mass of a copolymer of dimethylsiloxane and methylvinylsiloxane capped at both molecular chain terminals with hydroxy groups and having a Williams plasticity of 160 (vinyl group content=1.4 mass %), 41 parts by mass of fumed silica having a BET specific surface area of 130 m$^2$/g, and 5.6 parts by mass of methyl(3,3,3-trifluoropropyl)siloxane oligomer capped at both molecular chain terminals with hydroxy groups and having a kinematic viscosity of 30 mm$^2$/s were charged into a kneader mixer, mixed for 2 hours at 50° C., and further mixed for 2 hours at 120° C. under reduced pressure to prepare a fluorosilicone rubber base compound.

Next, in 100 parts by mass of this fluorosilicone rubber base compound, 3.9 parts by mass of an organopolysiloxane represented by the average unit formula:

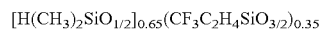

(amount such that silicon atom-bonded hydrogen atoms are 5.5 mol per 1 mol of all vinyl groups in the fluorosilicone rubber base compound), and 1 part by mass of a hydrosilylation reaction catalyst (platinum content=0.02 mass %) prepared by diluting a 1,3-divinyl-1,1,3,3-tetramethyldisiloxane complex of platinum with a copolymer of dimethylsiloxane and methylvinylsiloxane substantially capped at both molecular chain terminals blocked with dimethylvinylsiloxy groups, capped at a portion thereof with hydroxy groups and having a Williams plasticity of 165 (vinyl group content=0.07 mass %) were uniformly mixed to prepare a fluorosilicone rubber composition (2).

Reference Example 3

First, 100 parts by mass of methyl(3,3,3-trifluoropropyl)polysiloxane capped at both molecular chain terminals with dimethylvinylsiloxy groups and having a viscosity of 40 Pa·s (vinyl group content=0.15 mass %; the proportion of 3,3,3-trifluoropropyl groups per all silicon atom-bonded organic groups=about 49 mol %), 30 parts by mass of fumed silica having a BET specific surface area of 250 m$^2$/g, 0.6 parts by mass of 1,3-divinyltetramethyldisilazane, 6.0 parts by mass of 1,3-di(3,3,3-trifluoropropyl)tetramethyldisilazane, 3.0 parts by mass of hexamethyldisilazane, and 2.2 parts by mass of water were charged into a Ross mixer, mixed for 2 hours at 50° C., and further mixed for 2 hours at 120° C. under reduced pressure to prepare a fluorosilicone rubber base compound.

Next, in 100 parts by mass of this fluorosilicone rubber base compound, 2.8 parts by mass of an organopolysiloxane represented by the average unit formula:

[H(CH$_3$)$_2$SiO$_{1/2}$]$_{0.65}$(CF$_3$C$_2$H$_4$SiO$_{3/2}$)$_{0.35}$ (amount such that silicon atom-bonded hydrogen atoms are 1.2 mol per 1 mol of all vinyl groups in the fluorosilicone rubber base compound), and 0.3 parts by mass of a hydrosilylation reaction catalyst prepared by microencapsulating a 1,3-divinyl-1,1,3,3-tetramethyldisiloxane complex of platinum with a thermoplastic silicone resin (platinum content=0.02 mass %) were uniformly mixed to prepare a fluorosilicone rubber composition (3).

Reference Example 4

First, 100 parts by mass of a copolymer of methylvinylsiloxane and methyl(3,3,3-trifluoropropyl)siloxane capped at both molecular chain terminals with hydroxy groups and having a Williams plasticity of 300 (vinyl group content=0.01 mass %; the proportion of 3,3,3-trifluoropropyl groups per all silicon atom-bonded organic groups=about 50 mol %), 5.6 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 5.6 parts by mass of a copolymer of dimethylsiloxane and methylvinylsiloxane capped at both molecular chain terminals with hydroxy groups and having a Williams plasticity of 160 (vinyl group content=1.4 mass %), 41 parts by mass of fumed silica having a BET specific surface area of 130 m$^2$/g, and 5.6 parts by mass of methyl(3,3,3-trifluoropropyl)siloxane oligomer capped at both molecular chain terminals with hydroxy groups and having a kinematic viscosity of 30 mm$^2$/s were charged into a kneader mixer, mixed for 2 hours at 50° C., and further mixed for 2 hours at 120° C. under reduced pressure to prepare a fluorosilicone rubber base compound.

Next, in 100 parts by mass of this fluorosilicone rubber base compound, 2.0 parts by mass of a copolymer of methylhydrogensiloxane and methyl(3,3,4,4,5,5,6,6,6-nonafluorohexyl)siloxane represented by the formula:

(CH$_3$)$_3$SiO[CH$_3$(C$_4$F$_9$C$_2$H$_4$)SiO]$_{12}$[CH$_3$HSiO]$_{28}$Si(CH$_3$)$_3$ and 0.55 parts by mass of 2,5-dimethyl-2,5-di(tertiary butyl peroxy)hexane were uniformly mixed to prepare a fluorosilicone rubber composition (4).

Reference Example 5

First, 30.9 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 29.2 parts by mass of dimethylpolysiloxane substantially capped at both molecular chain terminals with dimethylvinylsiloxy groups, capped at a portion thereof with hydroxy groups, and having a Williams plasticity of 160 (vinyl group content=0.01 mass %), 4.2 parts by mass of a copolymer of dimethylsiloxane and methylvinylsiloxane capped at both molecular chain terminals with hydroxy groups and having a Williams plasticity of 160 (vinyl group content=1.4 mass %), 26.7 parts by mass of fumed silica having a BET specific surface area of 300 m$^2$/g, and 8.9 parts by mass of a dimethylsiloxane oligomer capped at both molecular chain terminals with hydroxy groups and having a kinematic viscosity of 10 mm$^2$/s were charged into a kneader mixer, mixed for 2 hours at 50° C., and further mixed for 2 hours at 120° C. under reduced pressure to prepare a silicone rubber base compound.

Next, 0.3 parts by mass of 2,5-dimethyl-2,5-di(tertiary butyl peroxy)hexane were uniformly mixed with 100 parts by mass of this silicone rubber base compound to prepare a silicone rubber composition (5).

Reference Example 6

First, 30.9 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 29.2 parts by mass of dimethylpolysiloxane substantially capped at both molecular chain terminals with dimethylvinylsiloxy groups, capped at a portion thereof with hydroxy groups, and having a Williams plasticity of 160 (vinyl group content=0.01 mass %), 4.2 parts by mass of a copolymer of dimethylsiloxane and methylvinylsiloxane capped at both molecular chain terminals with hydroxy groups and having a Williams plasticity of 160 (vinyl group content=1.4 mass %), 26.7 parts by mass of fumed silica having a BET specific surface area of 300 m$^2$/g, and 8.9 parts by mass of a dimethylsiloxane oligomer capped at both molecular chain terminals with hydroxy groups and having a kinematic viscosity of 10 mm$^2$/s were charged into a kneader mixer, mixed for 2 hours at 50° C., and further mixed for 2 hours at 120° C. under reduced pressure to prepare a silicone rubber base compound.

Next, 0.4 parts by mass of dicumyl peroxide were uniformly mixed with 100 parts by mass of this silicone rubber base compound to prepare a silicone rubber composition (6).

Reference Example 7

First, 30.9 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 29.2 parts by mass of dimethylpolysiloxane substantially capped at both molecular chain terminals with dimethylvinylsiloxy groups, capped at a portion thereof with hydroxy groups, and having a Williams plasticity of 160 (vinyl group content=0.01 mass %), 4.2 parts by mass of a copolymer of dimethylsiloxane and methylvinylsiloxane capped at both molecular chain terminals with hydroxy groups and having a Williams plasticity of 160 (vinyl group content=1.4 mass %), 26.7 parts by mass of fumed silica having a BET specific surface area of 300 m$^2$/g, and 8.9 parts by mass of a dimethylsiloxane oligomer capped at both molecular chain terminals with hydroxy groups and having a kinematic viscosity of 10 mm²/s were charged into a kneader mixer, mixed for 2 hours at 50° C., and further mixed for 2 hours at 120° C. under reduced pressure to prepare a silicone rubber base compound.

Next, in 100 parts by mass of this silicone rubber base compound, 5.5 parts by mass of a hydrosilylation reaction catalyst (platinum content=0.02 mass %) prepared by diluting a 1,3-divinyl-1,1,3,3-tetramethyldisiloxane complex of platinum with a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %) and 0.25 parts by mass of 2,5-dimethyl-2,5-di(tertiary butyl peroxy)hexane were uniformly mixed to prepare a silicone rubber composition (7).

Reference Example 8

First, 30.9 parts by mass of a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 29.2 parts by mass of dimethylpolysiloxane substantially capped at both molecular chain terminals with dimethylvinylsiloxy groups, capped at a portion thereof with hydroxy groups, and having a Williams plasticity of 160 (vinyl group content=0.01 mass %), 4.2 parts by mass of a copolymer of dimethylsiloxane and methylvinylsiloxane capped at both molecular chain terminals with hydroxy groups and having a Williams plasticity of 160 (vinyl group content=1.4 mass %), 26.7 parts by mass of fumed silica having a BET specific surface area of 300 m²/g, and 8.9 parts by mass of a dimethylsiloxane oligomer capped at both molecular chain terminals with hydroxy groups and having a kinematic viscosity of 10 mm²/s were charged into a kneader mixer, mixed for 2 hours at 50° C., and further mixed for 2 hours at 120° C. under reduced pressure to prepare a silicone rubber base compound.

Next, in 100 parts by mass of this silicone rubber base compound, 0.5 parts by mass of a hydrosilylation reaction catalyst (platinum content=0.02 mass %) prepared by diluting a 1,3-divinyl-1,1,3,3-tetramethyldisiloxane complex of platinum with a copolymer of dimethylsiloxane and methylvinylsiloxane substantially capped at both molecular chain terminals with dimethylvinylsiloxy groups, capped at a portion thereof with hydroxy groups, and having a Williams plasticity of 165 (vinyl group content=0.07 mass %), 0.02 parts by mass of 1-ethynyl-1-cyclohexanol, and 0.83 parts by mass of a partially branched copolymer of dimethylsiloxane and methylhydrogensiloxane having a kinematic viscosity of 15 mm²/s (silicon atom-bonded hydrogen atom content=0.83 mass %) were uniformly mixed to prepare a silicone rubber composition (8).

Practical Examples 1 to 4

First, fluorosilicone rubber sheets with a thickness of 0.5 mm were produced by heating the fluorosilicone rubber compositions prepared in Reference Examples 1 to 3 for 10 minutes at 120° C. Next, the silicone rubber composition prepared in Reference Example 5 or 6 was laminated to a thickness of 2.0 mm on one side of the fluorosilicone rubber sheet. A laminated sheet of a fluorosilicone rubber and a silicone rubber was then produced by heat press molding the fluorosilicone rubber sheet on which a silicone rubber composition layer was formed for 10 minutes at 170° C. The adhesion between the fluorosilicone rubber layer and the silicone rubber layer of this laminated sheet was evaluated, and the results are shown in Table 1.

Practical Example 5

First, the fluorosilicone rubber composition (1) prepared in Reference Example 1 was molded into a sheet shape with a thickness of 0.5 mm, and the silicone rubber composition (5) prepared in Reference Example 5 was then laminated to a thickness of 2.0 mm on this fluorosilicone rubber composition sheet. A laminated sheet of a fluorosilicone rubber and a silicone rubber was then produced by heat press molding this laminate for 10 minutes at 170° C. The adhesion between the fluorosilicone rubber layer and the silicone rubber layer of this laminated sheet was evaluated, and the results are shown in Table 1.

Comparative Example 1

First, the fluorosilicone rubber composition (4) prepared in Reference Example 4 was molded into a sheet shape with a thickness of 0.5 mm, and the silicone rubber composition (7) prepared in Reference Example 7 was then laminated to a thickness of 2.0 mm on this fluorosilicone rubber composition sheet. A laminated sheet of a fluorosilicone rubber and a silicone rubber was then produced by heat press molding this laminate for 10 minutes at 170° C. The adhesion between the fluorosilicone rubber layer and the silicone rubber layer of this laminated sheet was evaluated, and the results are shown in Table 1.

Comparative Example 2

First, a fluorosilicone rubber sheet with a thickness of 0.5 mm was produced by heating the fluorosilicone rubber composition (4) prepared in Reference Example 4 for 10 minutes at 170° C. Next, the silicone rubber composition (7) prepared in Reference Example 7 was laminated to a thickness of 2.0 mm on one side of the fluorosilicone rubber sheet. A laminated sheet of a fluorosilicone rubber and a silicone rubber was then produced by heat press molding the fluorosilicone rubber sheet on which a silicone rubber composition layer was formed for 10 minutes at 170° C. The adhesion between the fluorosilicone rubber layer and the silicone rubber layer of this laminated sheet was evaluated, and the results are shown in Table 1.

Comparative Example 3

First, a fluorosilicone rubber sheet with a thickness of 0.5 mm was produced by heating the fluorosilicone rubber composition (1) prepared in Reference Example 1 for 10 minutes at 120° C. Next, the silicone rubber composition (8) prepared in Reference Example 8 was laminated to a thickness of 2.0 mm on one side of the fluorosilicone rubber sheet. A laminated sheet of a fluorosilicone rubber and a silicone rubber was then produced by heat press molding the fluorosilicone rubber sheet on which a silicone rubber composition layer was formed for 10 minutes at 120° C. The adhesion between the fluorosilicone rubber layer and the silicone rubber layer of this laminated sheet was evaluated, and the results are shown in Table 1.

[Adhesion Evaluation]

After the laminates prepared as described above were left to stand for one day at room temperature, the laminates were cut into ribbons with a width of 25 mm, and the initial adhesion between the fluorosilicone rubber layer and the silicone rubber layer was evaluated based on T-type peeling. In addition, after the laminates prepared as described above were further left to stand for seven days in an oven at 200° C., the adhesion after thermal aging was similarly evaluated based on T-type peeling. Cases in which the fluorosilicone rubber layer and the silicone rubber layer adhered firmly and exhibited cohesive failure at the time of peeling were evaluated as "⊚"; cases in which the fluorosilicone rubber layer and the silicone rubber layer adhered and cohesive failure was observed at the time of peeling, but interfacial peeling was observed in some areas were evaluated as "○"; cases in which the fluorosilicone rubber layer and the silicone rubber layer were in close contact and strong peeling resistance was observed at the time of peeling, but interfacial peeling was observed were evaluated as "Δ"; and cases in which the fluorosilicone rubber layer and the silicone rubber layer exhibited interfacial peeling with no resistance during T-type peel testing so that the adhesion could not be evaluated were evaluated as "x".

TABLE 1

| Segment Items | Practical Examples | | | | | Comparative Examples | | |
|---|---|---|---|---|---|---|---|---|
| | 1 | 2 | 3 | 4 | 5 | 1 | 2 | 3 |
| Type of Fluorosilicone Rubber Composition | (1) | (1) | (2) | (3) | (1) | (4) | (4) | (1) |
| Type of Silicone Rubber Composition | (5) | (6) | (5) | (5) | (5) | (7) | (7) | (8) |
| Adhesion (initial) | ⊚ | ⊚ | ○ | ⊚ | ⊚ | Δ | X | X |
| Adhesion (after thermal aging) | ⊚ | ○ | ⊚ | ⊚ | ⊚ | X | X | X |

INDUSTRIAL APPLICABILITY

The laminate of the fluorosilicone rubber and the silicone rubber produced with the production method of the present invention has excellent adhesion between the fluorosilicone rubber layer and the silicone rubber layer, and is therefore suitable as a material for transportation equipment parts such as automobile or aircraft parts or petroleum marine equipment parts, in particular, a turbo hose for automobiles.

REFERENCE NUMERALS

1: Fluorosilicone rubber layer
2: Silicone rubber layer

The invention claimed is:

1. A production method for a laminate of a fluorosilicone rubber and a silicone rubber, said method comprising the following steps (1) to (3):
   (1) curing a fluorosilicone rubber composition comprising components (A) to (C) below;
      (A) 100 parts by mass of (A1) an organopolysiloxane having at least 2 alkenyl groups per molecule, wherein at least 20 mol % of all silicon atom-bonded organic groups are fluoroalkyl groups, or a mixture of component (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;
      (B) an organopolysiloxane having at least 2 silicon atom-bonded hydrogen atoms and at least 1 fluoroalkyl group per molecule, in an amount that the silicon atom-bonded hydrogen atoms in this component exceed 1 mol per 1 mol of the alkenyl groups in component (A); and
      (C) a hydrosilylation reaction catalyst in a catalytic amount;
   (2) laminating a silicone rubber composition comprising components (D) and (E) below on a surface of a fluorosilicone rubber produced in step (1) above;
      (D) 100 parts by mass of an organopolysiloxane having at least 1 alkenyl group per molecule, and having no fluoroalkyl groups or having fluoroalkyl groups in a proportion of less than 20 mol % of all silicon atom-bonded organic groups; and
      (E) from 0.1 to 10 parts by mass of an organic peroxide; and
   (3) curing the silicone rubber composition laminated in step (2) above;
   wherein the organopolysiloxane (B) is

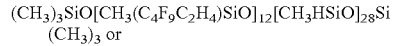

or

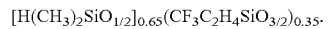

2. The production method for a laminate according to claim 1, wherein the fluorosilicone rubber composition further comprises: a silica powder.

3. The production method for a laminate according to claim 1, wherein the fluorosilicone rubber composition further comprises: a reaction inhibitor.

4. The production method for a laminate according to claim 2, wherein the fluorosilicone rubber composition further comprises: a reaction inhibitor.

5. The production method for a laminate according to claim 1, wherein the hydrosilylation reaction catalyst (C) is a hydrosilylation reaction platinum-based catalyst.

6. The production method for a laminate according to claim 5, wherein the hydrosilylation reaction platinum-based catalyst is an alkenyl siloxane complex of platinum.

7. The production method for a laminate according to claim 6, wherein the alkenyl siloxane complex of platinum is a 1,3-divinyl-1,1,3,3-tetramethyldisiloxane complex of platinum.

8. The production method for a laminate according to claim 1, wherein the organic peroxide (E) is 2,5-dimethyl-2,5-di(tertiary butyl peroxy)hexane or dicumyl peroxide.

9. The production method for a laminate according to claim 1, wherein the organopolysiloxane (B) is $(CH_3)_3SiO[CH_3(C_4F_9C_2H_4)SiO]_{12}[CH_3HSiO]_{28}Si(CH_3)_3$.

10. The production method for a laminate according to claim 1, wherein the organopolysiloxane (B) is $[H(CH_3)_2SiO_{1/2}]_{0.65}(CF_3C_2H_4SiO_{3/2})_{0.35}$.

11. The production method for a laminate according to claim 10, wherein the fluorosilicone rubber composition further comprises: a silica powder and a reaction inhibitor.

12. A production method for a laminate of a fluorosilicone rubber and a silicone rubber, said method comprising the following steps (1') and (2'):
   (1') producing a laminate of a fluorosilicone rubber composition layer and a silicone rubber composition layer by laminating a fluorosilicone rubber composition comprising components (A) to (C) below:
      (A) 100 parts by mass of (A1) an organopolysiloxane having at least 2 alkenyl groups per molecule, wherein at least 20 mol % of all silicon atom-bonded organic groups are fluoroalkyl groups, or a mixture of component (A1) and (A2) an organopolysiloxane having at least 2 alkenyl groups per molecule, and having no fluoroalkyl groups or having fluoroalkyl groups in a proportion of less than 20 mol % of all silicon atom-bonded organic groups;

(B) an organopolysiloxane having at least 2 silicon atom-bonded hydrogen atoms and at least 1 fluoroalkyl group per molecule, in an amount that the silicon atom-bonded hydrogen atoms in this component exceed 1 mol per 1 mol of the alkenyl groups in component (A); and (C) a hydrosilylation reaction catalyst in a catalytic amount, and a silicone rubber composition comprising components (D) and (E) below:

(D) 100 parts by mass of an organopolysiloxane having at least 1 alkenyl group per molecule, and having no fluoroalkyl groups or having fluoroalkyl groups in a proportion of less than 20 mol % of all silicon atom-bonded organic groups; and (E) from 0.1 to 10 parts by mass of an organic peroxide; and (2') curing the fluorosilicone rubber composition layer and the silicone rubber composition layer of the laminate produced in step (1') above;

wherein the organopolysiloxane (B) is $(CH_3)_3SiO[CH_3(C_4F_9C_2H_4)SiO]_{12}[CH_3HSiO]_{28}Si(CH_3)_3$ or $[H(CH_3)_2SiO_{1/2}]_{0.65}(CF_3C_2H_4SiO_{3/2})_{0.35}$.

13. The production method for a laminate according to claim 12, wherein the fluorosilicone rubber composition further comprises: a silica powder.

14. The production method for a laminate according to claim 13, wherein the fluorosilicone rubber composition further comprises: a reaction inhibitor.

15. The production method for a laminate according to claim 12, wherein the fluorosilicone rubber composition further comprises: a reaction inhibitor.

16. The production method for a laminate according to claim 12, wherein the organopolysiloxane (B) is $(CH_3)_3SiO[CH_3(C_4F_9C_2H_4)SiO]_{12}[CH_3HSiO]_{28}Si(CH_3)_3$.

17. The production method for a laminate according to claim 12, wherein the organopolysiloxane (B) is $[H(CH_3)_2SiO_{1/2}]_{0.65}(CF_3C_2H_4SiO_{3/2})_{0.35}$.

* * * * *